(12) United States Patent
Masenza et al.

(10) Patent No.: US 11,144,974 B2
(45) Date of Patent: Oct. 12, 2021

(54) SYSTEM AND METHOD FOR IMPROVED MANAGEMENT OF A PURCHASE ORDER BY INTERCEPTING AND PARSING MESSAGES

(71) Applicant: Ingram Micro S.r.l. (Società a Socio Unico), Settala (IT)

(72) Inventors: Antonio Masenza, Rimini (IT); Pietro Viccardi, Vimercate (IT)

(73) Assignee: Ingram Micro S.r.l. (Società a Socio Unico), Settala (IT)

( * ) Notice: Subject to any disclaimer, the term of this patent is extended or adjusted under 35 U.S.C. 154(b) by 110 days.

(21) Appl. No.: 16/515,729

(22) Filed: Jul. 18, 2019

(65) Prior Publication Data
US 2019/0340662 A1    Nov. 7, 2019

Related U.S. Application Data

(63) Continuation of application No. 14/862,687, filed on Sep. 23, 2015, now Pat. No. 10,402,875.

(30) Foreign Application Priority Data

Sep. 30, 2014  (EP) .................................... 14187092

(51) Int. Cl.
    *G06Q 30/06*        (2012.01)
(52) U.S. Cl.
    CPC ..... *G06Q 30/0605* (2013.01); *G06Q 30/0625* (2013.01); *G06Q 30/0631* (2013.01); *G06Q 30/0637* (2013.01)
(58) Field of Classification Search
    CPC ............................. G06Q 30/06; G06Q 30/0605
    USPC .............................................. 705/26.1–27.2
    See application file for complete search history.

(56) References Cited

U.S. PATENT DOCUMENTS

| 7,983,961 | B1 | 7/2011 | Chang et al. |
| 2002/0156685 | A1* | 10/2002 | Ehrlich ................. G06Q 30/02 705/26.41 |
| 2014/0279222 | A1 | 9/2014 | Lampert |

OTHER PUBLICATIONS

Kohavi, Ron, et al. "Controlled Experiments on the Web: Survey and Practical Guide." Data Mining and Knowledge Discovery 18.1 (2009): 140-81. ProQuest. Web. Apr. 11, 2019.*

(Continued)

*Primary Examiner* — Jeffrey A. Smith
*Assistant Examiner* — Jennifer V Lee
(74) *Attorney, Agent, or Firm* — DLA Piper LLP (US)

(57) ABSTRACT

A method for improved management of a purchase order comprises searching online for at least one product or group of products similar to each other to be ordered from a generic supplier and obtaining a confirmation of availability. The step of searching for the product to be ordered from the generic supplier can be extended to search for the product or the group of products or alternative products available at at least one alternative supplier. The product or group of products or the alternative products found at the alternative supplier are inserted into a shopping cart of the alternative supplier and compared with the product or the group of products of the generic supplier. The extension of the search is started automatically by a search and compare software application authorized by the user and provided by the alternative supplier.

27 Claims, 12 Drawing Sheets

(56) References Cited

OTHER PUBLICATIONS

European Search Report dated Mar. 20, 2015 for corresponding European Application No. 14187092.3.
Kohavi, Ron, et al. "Controlled Experiments on the Web: Survey and Practical Guide," Data Mining and Knowledge Discovery 18.1 (2009); pp. 140-181, ProQuest, Web. Apr. 11, 2019.

\* cited by examiner

| escriptions | Quantity | Prezzo di latino | Disp. | Prezzo* | Disp C&C | Prezzo C&C | Importo | Cons Gru |
|---|---|---|---|---|---|---|---|---|
| P.WIRELESS 802.11B/ | 1 | €30,21 | 1 | €25,58 | 0 | €26,71 | €26,58 | NO |
| AVO PATCH CATEGORIA | 1 | €5,66 | 27 | €3,75 | 0 | €3,77 | €3,75 | NO |
| WISSGEAR PEGASUS BA | 1 | €53,90 | 0 | €43,18 | 2 | €43,40 | €43,18 | NO |
| LITEBOOK 840 15-420 | 1 | €948,40 | 30 | €889,00 | 0 | €893,45 | €889,00 | NO |
| IMAC 21,5 CORE I5 2 | 1 | | | | 2 | €1.060,27 | €1.055,00 | NO |
| COMPENSI | | | | | | | €1,90 | |
| MACBOOK AIR 13 1.4G | 1 | | | | 0 | €820,08 | €816,00 | NO |
| COMPENSI | | | | | | | €1,90 | |

*Nautilus – notification*

Do you want to compare prices and send all chart data to Nautilus?

- Compare Without Data
- Compare With Data
- Cancel Operation

SVUOTA CARRELLO  AGG

RAMMI 'FEDELTA'

| ale | Periodo di accumulo | Valore Buono Sconto | Fatturato da raggiungere | Fatturato attuale | TI mancano... |
|---|---|---|---|---|---|
| mo sumabill | maggio 2014 | €10,00 | €100,00 | €0,00 | €100,00 |

Internet Explorer Button
Safari Button
Chrome Button
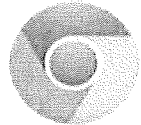
Firefox Button
FIG. 3

SYSTEM AND METHOD FOR IMPROVED MANAGEMENT OF A PURCHASE ORDER BY INTERCEPTING AND PARSING MESSAGES

TECHNICAL FIELD

The present disclosure relates to methods and systems for improved management of a purchase order via the Internet in a manner that improves computer efficiency, for example, an order for the purchase of products which are similar or different, or services which in turn are similar or different.

BACKGROUND

Problems exist in the field of Internet order purchasing; for example, the online purchasing of products or services. It is difficult and inefficient to provide the User with sufficient information, such as price, payment conditions, technical details and other aspects, which would allow the User to compare the purchase against other possible purchases for similar or alternative goods and/or services. These problems may be characterized, for example, as a technical challenge that is particular and tied to computers and the Internet, including (for example) difficulties and lack of computer efficiencies in retrieving from various websites alternative products and/or services, preventing a User from having to launch multiple webpages (thereby consuming computer resources), difficulties in formulating comparative orders sourced from different Suppliers and/or websites and presenting them to Users in an efficient manner, and others.

Accordingly, there is a need for systems and methods that would allow a User to (prior to finalizing an on-line order) quickly and efficiently view comparable orders sourced from other Suppliers so that the User is able to compare the quality of the order he/she created against other possible orders. Similarly, there is a need for systems and methods that would allow the Supplier or the retailer of goods and/or services that can be purchased on-line to provide information about the goods and/or services offered, including technical and price information, which may be useful for readily comparing against the quality of an order created by a User, providing (for example) an indication of the savings which the User could obtain by avoiding placing the order with other Suppliers or retailers, both in terms of the cost of the product or service itself and in the terms of the overall cost (e.g., shipping, handling, etc.), said information being supplied automatically to the User during preparation of an order, thus avoiding the User having to prepare or create the order with another Supplier, and therefore overcoming the limitations and drawbacks which hitherto affect the methods and the systems according to the prior art. The solution to this need is necessarily rooted in computer technology, and the present disclosure overcomes the problems specifically arising in the realm of computer networks and the Internet.

SUMMARY

The present disclosure describes, in one embodiment, executing an application associated with a Supplier A, for example, a Supplier of IT products or electronic devices or software, or different durable goods or services, only after a User (e.g., a purchaser) has prepared an order via the Internet with a Supplier B, acquiring in the (software) application of the Supplier A the order of the Supplier B and reformulating the order automatically in said application, with products (or services) which are identical (and/or comparable) to those found with the Supplier B or with alternative products (or services) available in the sales network of the Supplier A, providing said products (or services) with comparative information, including, for example, the price, which may help the User to make a quick comparison between the offers of Supplier A and the Supplier B, and to confirm the order of the Supplier A, if it is better than that of the Supplier B. In an embodiment, Supplier B can be a generic or usual Supplier and Supplier A can be an alternative Supplier to the Supplier B.

Advantageously, an order for different articles may be reformulated automatically with the products or with alternative products of the Supplier A and without any action on the part of the User. For example, the application associated with the Supplier A may be executed only after the order has been prepared with the Supplier B and therefore it may receive en bloc all the information relating to the different articles X, Y necessary for formulating a comparative offer. The application may be executed upon confirmation of the order to Supplier B and before said order has been sent or processed by the Supplier B for payment and supply.

According to the present disclosure, the comparison may be carried out by reversing the steps of searching for the products available with the Supplier B and the Supplier A, for example, by allowing the User to compile firstly the order, including the products, with the Supplier B and proposing the corresponding products or alternative products of the Supplier A subsequently.

In an embodiment, the present disclosure comprises a method for improved management of a purchase order by Internet, comprising the steps of:

searching on-line for at least one product or group of products (and/or service or group of services) to be ordered from a Supplier B;

obtaining a confirmation of availability; and characterized in that the step of searching for the product (and/or service (s)) to be ordered from the Supplier B can be extended to search for the product or the group of products or alternative products (and/or service(s) available from at least one Supplier A who is an alternative to the Supplier B, and the product or the group of products or the alternative products (and/or service(s)) found with the Supplier A may be entered in a shopping cart of the Supplier A and compared, in said cart of the Supplier A, with the product or group of products (and/or service(s)) of the Supplier B; wherein the extension of the search step may be started automatically by a search and compare (software) application authorized by the User and provided by the Supplier A.

The User may prepare an order for products with a customary Supplier B, for example, an order comprising a notebook and a monitor, and automatically receive, at the end of said order, a comparative offer from the Supplier A, in which each product ordered from the Supplier B may be compared with a similar product offered by the Supplier A or with an alternative product of said Supplier A, and in which the offer or order automatically proposed by the Supplier A comprises the technical and/or cost-related information (and/or any other desired information) relating to the individual products and to the entire order, which allows the User to make the most appropriate choice.

According to one embodiment of the present disclosure, the order proposed by the Supplier A as an alternative to the Supplier B is generated automatically by means of the search and compare software application installed on the electronic device of the User, which receives as its input the information relating to the order with the Supplier B and provides as its output the alternative order with the comparative information. This software application may be configured as middleware or an input/output interface between the sales system (for example, the on-line shop) of the Supplier B and the sales system of the Supplier A.

According to another embodiment of the present disclosure, the search and compare software application may also be executed manually by the User, e.g., without being activated beforehand by the website or on-line shop of the Supplier B. This execution mode may be advantageous for searching for promotions directly with the Supplier A or for preparing an order directly with the Supplier A.

According to a method of the present disclosure, several types of orders may be implemented using different shopping carts, e.g., an online purchase cart. A first type of cart ("Standard cart" or "standard cart") may be associated with new or standard products, a second type of cart ("Outlet cart" or "outlet cart") may be associated with partially defective or outlet products; and a third type of cart ("Solutions cart" or "solutions cart") may be associated with services which are combined or associated with given products, and the carts of said different types may be selected via a web module (for example as shown in exemplary screenshot/mask 1200 of FIG. 12).

A plurality of carts associated with one or more types of carts may be handled simultaneously, for example, creating a new purchase cart, saving a purchase cart with the associated products or groups of products, eliminating a cart, or performing the check-out of a cart.

For example, a check-out of the cart may comprise a transfer of the ordered products in the Supplier cart to a purchase system of the Supplier A, said purchase system being designed to perform management of the payment, invoicing, delivery of the ordered products, etc. The purchase system may be separate from the search and compare application; for example, this system may be the online shop of the Supplier A.

The search and compare software application may be executed as middleware or a data input/output interface between a purchase system of the Supplier B and a purchase system of the Supplier A, and the middleware may receive as its input the products ordered by the User in the purchase system of the Supplier B and provide as its output, for the purchase system of the Supplier A, the products, the groups of products or the alternative products which the User intends on purchasing from the Supplier A.

The present disclosure may provide an improved system for managing a purchase order by Internet, and in particular an order for similar or different articles, (for example goods or services), comprising a search and compare software application installed on an electronic device of a User, provided by a Supplier of similar products, said search and compare software application comprising:

means for intercepting a confirmation of an order for products or groups of products placed via the Internet via the electronic device with a Supplier B;

means for reading information relating to the products or groups of products ordered from the Supplier B or means for formulating an order for said products, groups of products or alternative products with the Supplier A;

means for inserting said products, groups of products or alternative products of the Supplier A in a shopping cart of the Supplier A together with comparative information relating to said products or groups of products available from the Supplier B, wherein said search and compare application being intended to be authorized by the User before execution on the electronic device.

According to an exemplary system of the present disclosure, the search and compare software application may be run in the background along with the other applications of the electronic device preparing the order in the purchase system of the Supplier B, or hidden from the User, and said means for intercepting the order may modify the state of execution of the software application, making it visible to the User, so as to allow purchase of the order and its transfer to a purchase system of the Supplier A.

Further characteristic, features and advantages of the methods and the systems according to the present disclosure will become clear from the description herein below with reference to the accompanying drawings provided purely by way of non-limiting examples.

BRIEF DESCRIPTION OF THE
ACCOMPANYING DRAWINGS

The present disclosure is illustrated by way of example, and not by way of limitation, and will become apparent upon consideration of the following detailed description, taken in conjunction with the accompanying drawings, in which like reference characters refer to like parts throughout, and in which:

FIG. 1 shows a screenshot of an exemplary client software application of a Supplier B according to an exemplary method for managing an order, and more particularly, the figure shows the cart page of a Supplier B in the background, and the figure shows in the foreground an automatic request window of the software application for creating the cart of a Supplier A, according to an embodiment of the present disclosure.

FIG. 2 shows an exemplary web interface which is retrieved by a search and compare application of a Supplier A, upon completion of an order performed, for example, with the client application of FIG. 1, according to an embodiment of the present disclosure.

FIG. 3 shows in schematic form an exemplary search and compare application, for example of FIG. 2, installed in four different browsers or navigators of a User device, according to an embodiment of the present disclosure.

FIG. 5 is an exemplary variant of an interface, for example, according to FIG. 2, in which the prices of the products ordered from a Supplier B and the snap-shot of the cart of this Supplier B are shown, according to an embodiment of the present disclosure.

FIG. 8 shows a screenshot of the result of an exemplary search, according to an embodiment of the present disclosure.

FIG. 11 is an exemplary graphical interface showing the orders or carts managed in the past by a given User and for which the ordered products have been saved but not yet purchased, according to an embodiment of the present disclosure.

DETAILED DESCRIPTION

Figure 4:
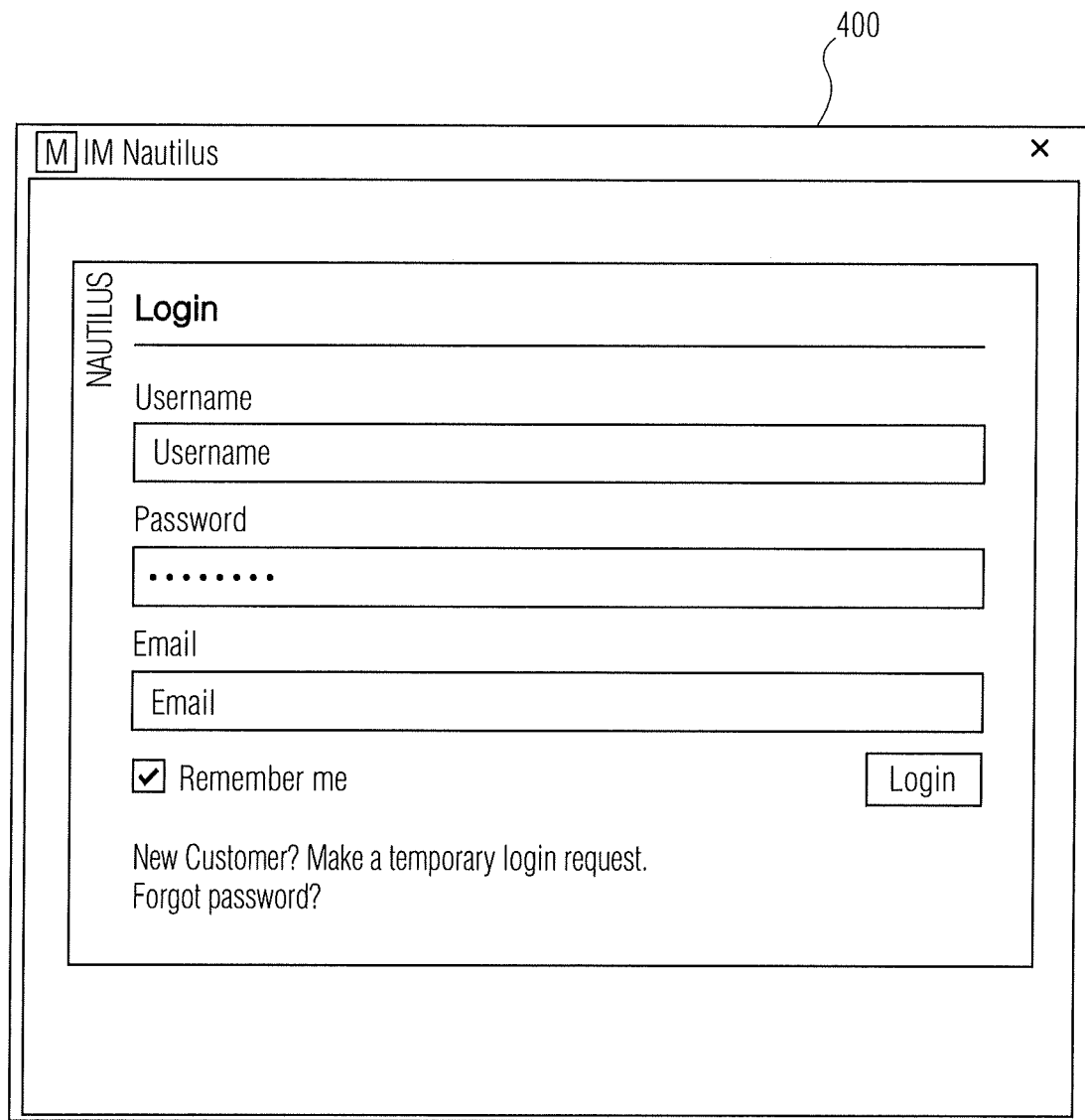
FIG. 4 shows an exemplary screen for access to a web interface of the search and compare application, according to an embodiment of the present disclosure.

With reference to the accompanying drawings, systems and methods for managing an order via the Internet according to the present disclosure, and in particular systems and methods for managing the order of products and/or services via electronic devices and the like or similar and/or different goods and/or services is described below.

The term "computer" or "computing device" shall refer to any electronic device or devices, including those having capabilities to be utilized in connection with a purchase order system, such as any device capable of receiving, transmitting, processing and/or using data and information. A computer or computing device may comprise one or more of the following: a server, a processor, a microprocessor, a personal computer, such as a laptop, palm PC, desktop or workstation, a network server, a mainframe, an electronic wired or wireless device, such as for example, a telephone, a cellular telephone, a personal digital assistant, a smartphone, an interactive television, such as for example, a television adapted to be connected to the Internet or an electronic device adapted for use with a television, an electronic pager or any other computing and/or communication device.

In one embodiment, one or more specifically configured computers or computing devices may be specifically configured to perform and exhibit the various features and methods described herein.

The term "User(s)" or "user(s)" shall refer to any person or entity (or system) that utilizes directly or indirectly the systems and/or methods described herein, including, without limitation, a person or entity (or system) who desires to purchase online (e.g., via Internet or other wired or wireless network) products and/or services, irrespective as to whether the User is a physical person, a Supplier and/or any other type if entity. The term "Supplier(s)" or "supplier(s)" shall refer to any person or entity (or system) that may directly or indirectly supply any products and/or services, including, without limitation, an organization or a physical person who is performing the function of supplying the products or services, irrespective as to whether they are a retailer, a manufacturer, an actual supplier or any other type of entity.

In one embodiment, the present disclosure relates to the improved management of orders for the purchase by Internet of electronic or IT articles that include, for example, (without limitation): personal computers, notebooks, PDAs, smartphones, monitors, printers and office devices in general, or software, such as management or accounting programs, programs for managing documents, graphics, music, etc., or services associated with information technology, such as the installation of printers, software upgrades, hardware and software maintenance or toner disposal. It should be understood, however, that the present disclosure is not limited thereto. To the contrary, the present disclosure relates to the purchase of any type of products and/or services.

In another embodiment, the present disclosure relates to a method of the type mentioned above for ordering products or durable goods and/or services (including services compatible with these products/goods).

The present disclosure also relates to a system for improved management of a purchase order, comprising electronic devices which are connected to the Internet (or any other wired or wireless network) and by means of which it is possible to search for products and/or services to be purchased and prepare at least one order for them.

The present disclosure solves problems that exist in the field of Internet order purchasing and computer systems for on-line purchase, the problems including, for example, a technical challenge that is particular and tied to computers and the Internet, including (for example) difficulties and lack of computer efficiencies in retrieving from various websites alternative products and/or services, preventing a purchase from having to launch multiple webpages (thereby consuming computer resources), difficulties in formulating alternative orders sourced from different Suppliers and/or websites and presenting them to Users in an efficient manner, and others.

The present disclosure may be validly applied for the purchase of single products or groups of products which are similar to each other or different, without limitation. Purely by way of a non-exhaustive example, the following are mentioned (without limitation): personal computers, notebooks, PDAs, smartphones, monitors, printers, office devices in general or software, such as management or accounting programs, or programs for managing documents, graphics or music, etc.

Similarly, the present disclosure may be validly applied for the purchase of single services or groups of services which are similar to each other or different, without limitation. Purely by way of a non-exhaustive example, the following are mentioned (without limitation): services connected with the information technology sector, such as the installation of printers, software upgrades, hardware or software maintenance or toner disposal.

It is possible for the purchase of products to be combined with the purchase of services compatible with these products.

An order, according to the present disclosure, may be an order comprising, for example (without limitation), n products—similar or different—of a same brand or manufacturer or of different brands or manufacturers, software, hardware, electronic accessories or components, mobile phones, desktop or portable computers, printers, smartphones, servers, video games, consoles, monitors, graphic boards, and so on.

It is possible for a method according to the present disclosure to be implemented for the management of a single order, for example (without limitation), composed of a single product, and therefore for it to be applicable for facilitating management of an end User order involving small quantities, for example, the purchase of a single article.

According to another exemplary method of the present disclosure, a User possessing an electronic device, for example a portable or desktop computer connected to the Internet, may connect up to an Internet address where products can be ordered, for example an on-line shop or noticeboard or a search function which is made available at said Internet address. In another embodiment, the User may formulate the order via an Intranet application of the client-server type for managing orders.

In yet another embodiment of the present disclosure, the Internet address or the client and server software application may be associated with a Supplier B of products and/or services, for example, a usual Supplier of the User, and provide access to an order compilation mask where it is possible to search for the products and/or services, indicate the desired quantities and display the respective costs or technical details.

An example of said mask or interface is schematically shown in screenshot 100 of FIG. 1 in the background and deliberately shaded, it not being necessary to be able view its contents. In the Supplier mask, the User may search online for at least one product or group of products to be ordered from the Supplier B. "Products" are understood as meaning, for example, similar products belonging to a same category of goods, for example, various IT products or durable goods or consumables, for example, food products. However, the present disclosure is not limited to this aspect and may be applied to any type of products and/or services, including those which are different and unrelated from each other.

An exemplary method according to this disclosure may be applicable to any category of goods, for ordering products and also similar products from a given Supplier B. The software application available at the Internet address or the client software application of the Supplier B, following compilation of the order, may respond with an availability confirmation (for example, only for the products available).

According to the present disclosure, the step of searching for a product (and/or service) to be ordered from the Supplier B may be extended to a search for the product or the group of products or alternative products (and/or service(s)) with at least one Supplier A who is an alternative to the Supplier B.

For example, extension of the search step may be started automatically by a search and compare software application authorized by the User and provided by the Supplier A.

In an embodiment of the present disclosure, this software application is installed on the electronic device(s) of the User, for example, on a computer, service, mobile device (and/or any other electronic communication and/or computer processing device), and intercepts the order compiled by the User for the Supplier B (e.g., shown in the screenshot/mask 100 of FIG. 1), including the code of the articles or products ordered, the price, the technical details available, and it then uses said codes and details in order to identify, in a databank of the Supplier A, the corresponding products or alternative products, and reformulate an alternative order for the Supplier A.

For example, the software application which is installed on the electronic device of the User reads the HTML code of the Supplier B by means of a POST event, which is verified for example when the User clicks on "Send order". The code of an HTML page may be available unencrypted, such that each web page navigator may retrieve this information via the command "right-hand button" and then "view source" following a POST event which activates reading.

The software application may then capture the HTML code of the Supplier A's cart and perform parsing thereof in order to obtain the result of a JSON object, for example, according to predetermined specifications.

The parsing service can be broken down into two services, the first performing proper parsing of the HTML code, for example, of unencrypted data, of the Supplier B for creation of the cart, while the second carries out a search within the catalogue of the Supplier A for creation of the final cart to be proposed to the User.

By way of a non-limiting exemplary embodiment of the present disclosure, a description of an "alternative product generation" subroutine is provided below, said subroutine performing so-called parsing of the HTML code of the Supplier B's page which is visited by the User and is fetched.

Following the input request authorized by the User, the aforementioned subroutine is retrieved by means of the POST command and starts the procedure of the method according to an embodiment of the present disclosure. Certain properties may be defined in the header, for example:

AuthToken: BBB
Language: it

In POST, other properties may be entered, for example, the names of the Supplier B or the providers of the products:

alternativesupplier: "XXYYZZ"

The information of the cart to be saved may be entered in the body of an http request:

```
<html>
...............
</html>
Result positive (or no product found)
"productId": "1",
"alternativesupplierId": "1323",
"alternativesupplierPrice": 750,
"alternativesupplierAvailableQuantity": 2,
"alternativesupplierQuantity": 2,
"supplierProductId": "3",
"supplierName": "Provider",
"isInCart": true,
"images": null,
"title": "product title",
"description": "product description",
"availableQuantity": null,
"quantity": null,
"estimatedTimeAttend": null,
"OurPrice": null,
"points": null,
"technicalDataSheetUrl": null,
"children": null
```

The order which may be upgraded with the Supplier A is displayed on the electronic device with a comparison of the products which are ready for ordering from the Supplier B and the Supplier A.

Figure 2:
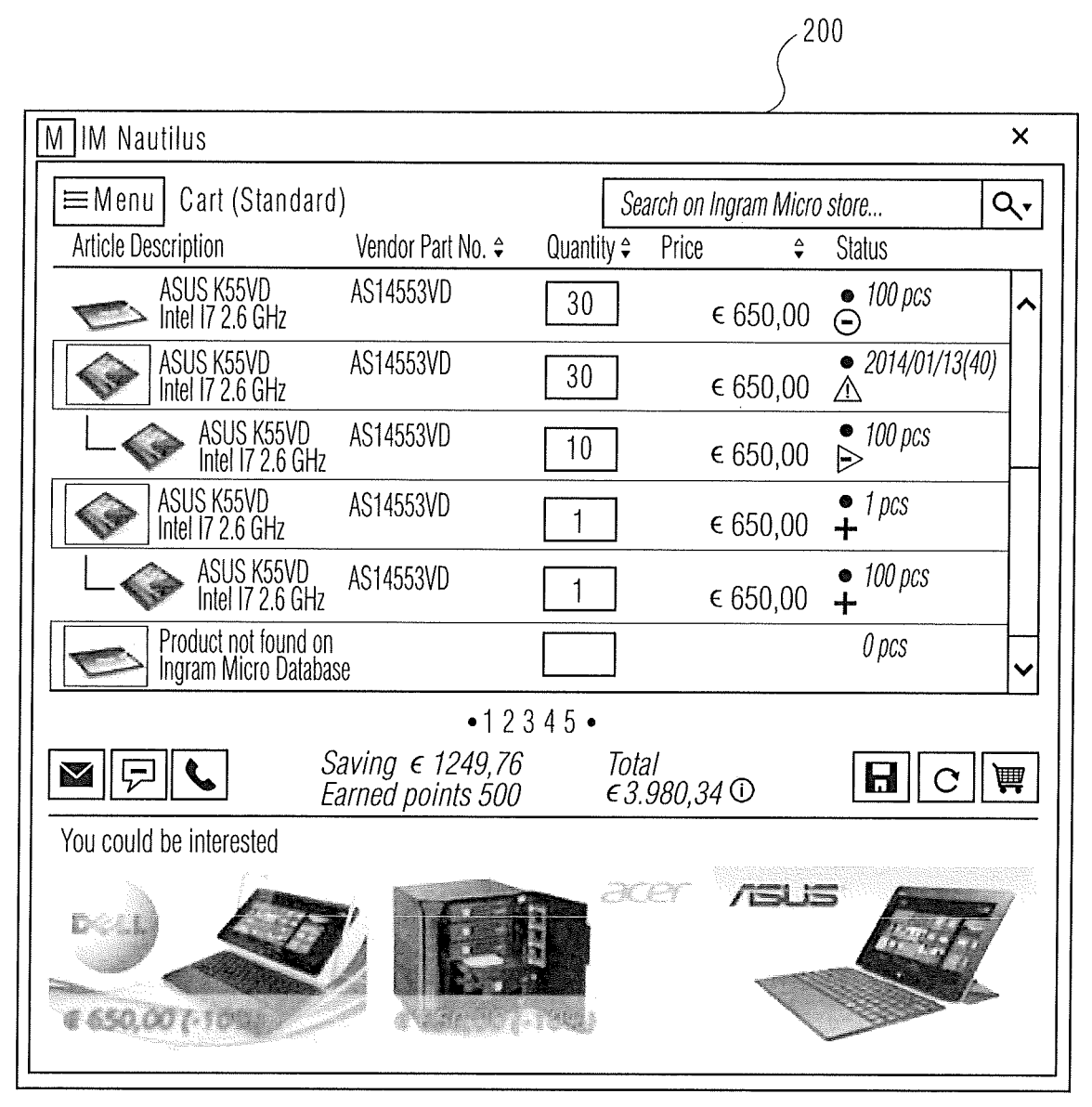
Figure 5:
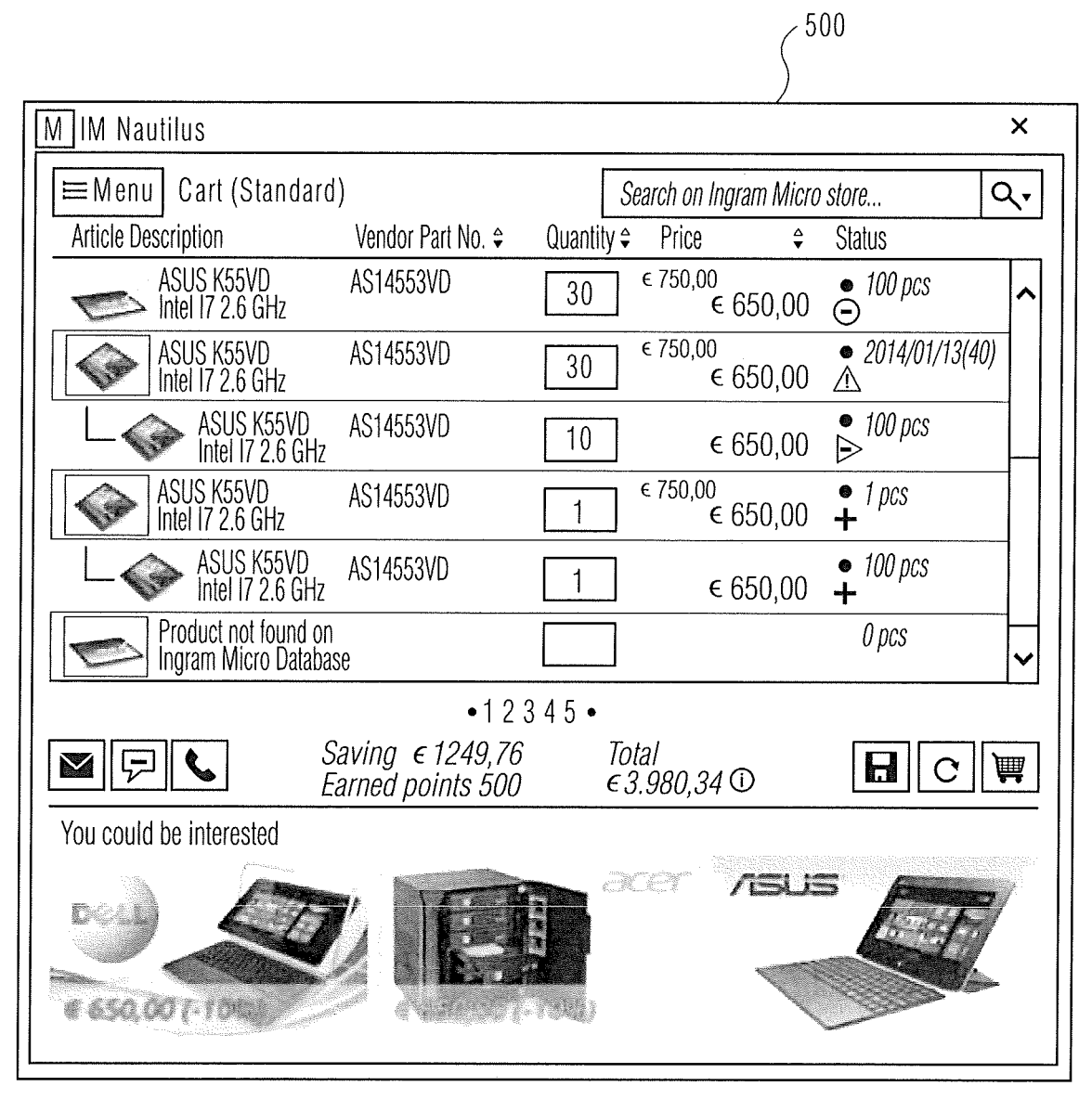

For example, the product or the group of products or the alternative products (and/or service(s)) found with the Supplier A may be entered automatically into a shopping cart of the Supplier A and compared, in said cart of the Supplier A, with the product or group of products of the Supplier B (for example, as shown in exemplary web interface 200 of FIG. 2 and exemplary variant of an interface 500 of FIG. 5).

Advantageously, according to this embodiment of the present disclosure, the User not only is relieved of the bothersome task of having to formulate again the order with the Supplier A in order to obtain a comparison of the orders, but he also does not have to deal with filling the shopping cart of the Supplier A, should the Supplier A be chosen for the order, following a comparison of the orders. In addition, the User's computing device is not burdened with having to expend resources formulating a comparative order and/or filling yet another shopping cart.

The on-line search step may be performed by means of a software application of the Supplier B (for example, client application or web application retrieved by the Internet address of the Supplier B) which may insert the products or the group of products into a shopping cart associated with the Supplier B, and the search and compare application of the Supplier A may transfer the products or group of products of the Supplier B to the shopping cart of the Supplier A.

In yet another embodiment of the present disclosure, the comparison step comprises a comparison of the price of the product or group of products or alternative products (and/or service(s)) available from a Supplier A with the price of the product or group of products available from a Supplier B. The comparison may be carried out on a single article and/or the entire cart. In other words, the comparison step may also comprise a comparison of the price (and/or other details) of all the products or group of products or alternative products (and/or service(s)) in the shopping cart of the Supplier A with the price (and/or other details) of all the products or group of products (and/or service(s)) searched for with the Supplier A.

The search and compare application may comprise a web interface which displays the products or groups of products compared in the shopping cart of the Supplier A (for example, as shown in exemplary variant of an interface 500 of FIG. 5). The web interface may be activated automatically, for example, at the end of compilation of the order with the Supplier B; and activation may be subject to a User authorization, for example, by means of a pop-up or an alert window, for example, as shown in screenshot 100 of FIG. 1.

The products, groups of products or alternative products (and/or service(s)) of the Supplier A may be divided up into standard products, products which are discounted because of minor defects, and combined products, and the standard or combined products may be searched for separately or jointly by means of the web interface where they are identified by means of a graphical symbol corresponding to them.

The web interface may not only be an interface for fetching the order formulated with the Supplier B and reformulating it according to the offer of the Supplier A, but may also be an interface for searching for the products or groups of products (and/or service(s)) which may be available from the Supplier A.

Figure 6:
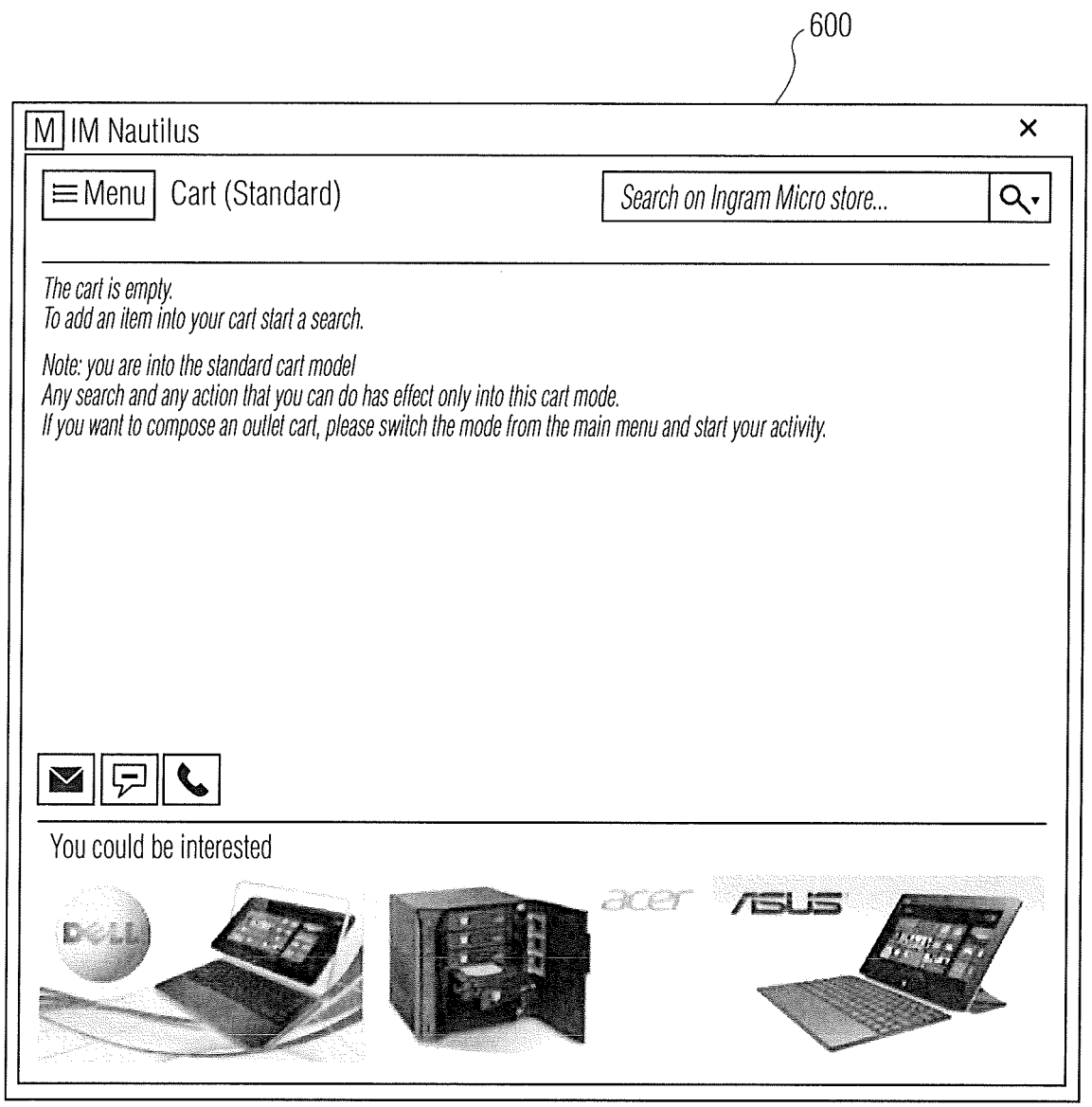
FIG. 6 is an exemplary interface, for example of FIG. 2 or FIG. 5, during an operating step where the cart of a Supplier A or B is empty and no available products have been identified, according to an embodiment of the present disclosure.

In an embodiment of the present disclosure, the cart of a Supplier A or B may be empty and no available products may be identified (for example, as shown in exemplary interface 600 of FIG. 6).

The web interface may comprise a counter which is associated with each item in the cart, so as to vary a quantity of products and/or services to be purchased, and/or a graphical symbol representing an immediate or future availability of the products and/or services from the Supplier A and/or a type of product and/or service, said type including partially defective products and/or services (e.g., "outlet" products) and defect-free products and/or services. The counter may be varied both if the interface comprises the products and/or services derived from the order previously formulated with the Supplier B, and if the interface comprises products and/or services derived directly from a search in the database of the Supplier A. The web interface may act as a shopping or purchase cart.

A User who notes a significant saving in the purchase of n products and/or services from the Supplier A compared to the Supplier B may immediately increase the number of products and/or services to be ordered in the cart of the Supplier A, with respect to that initially entered in the cart of the Supplier B.

According to one embodiment of the present disclosure, the search and compare application may be downloaded from an Internet site or address of the Supplier A, for example, as an executable file, and the executable file may be installed simultaneously in all the main browsers or navigators (for example, without limitation, iExplorer, Chrome, Firefox, etc.) available on an electronic device of the User or selectively in one or more of said available browsers or navigators.

Installation of the application may comprise a step requiring acceptance of the use and privacy conditions by the User, these also being preferably displayed again for acceptance even after initial log-in to the application. The language of the search and compare application may be set as default to correspond to the language of the browser and can in any case be modified by means of a settings panel of the application.

Following installation, the search and compare application may be executed manually by the User, by accessing an initial temporary welcome page (for example as shown in schematic 300 of FIG. 3) and an authentication screen (for example as shown in exemplary screen 400 of FIG. 4).

Authentication may be both for Users with a username and password obtained beforehand by means of registration on the website of the Supplier A, or for temporary Users with limited rights of use, said Users for example being prevented from completing the order (an exemplary check-out step is described below). Temporary use may be obtained by inserting information identifying a company requesting access, for example the company's title, name and surname of the legal representative, email address, telephone number, VAT code and/or tax code. It is possible, by means of encryption of the VAT (or any other identifying) code, to verify certain conditions which may also allow continuation of the temporary registration or terminate the procedure should given conditions not be satisfied.

According to the present disclosure, the products or groups of products (and/or service(s)) to be ordered from an authorized Supplier may comprise new products, products which are partially defective, for example consisting of a previously returned product, and combined solutions and/or services.

Merely by way of example, a new product may be a personal computer, the partially defective product may be a personal computer which is aesthetically or visibly damaged, but perfectly operational, and the solution may be a set of products which can be purchased en bloc, for example in order to create a server or a video game or a cloud platform.

By any appropriate means, such as for example via a web interface, it is possible to search for separately or jointly the new products, partially defective products or solutions and/or services by selecting a pushbutton on the graphical interface of the application and managing its shopping carts. The products, services and/or the solutions may be associated with a first standard cart and the partially defective products, solutions and/or services may be associated with a second shopping cart, for separate processing of the orders.

Figure 7:
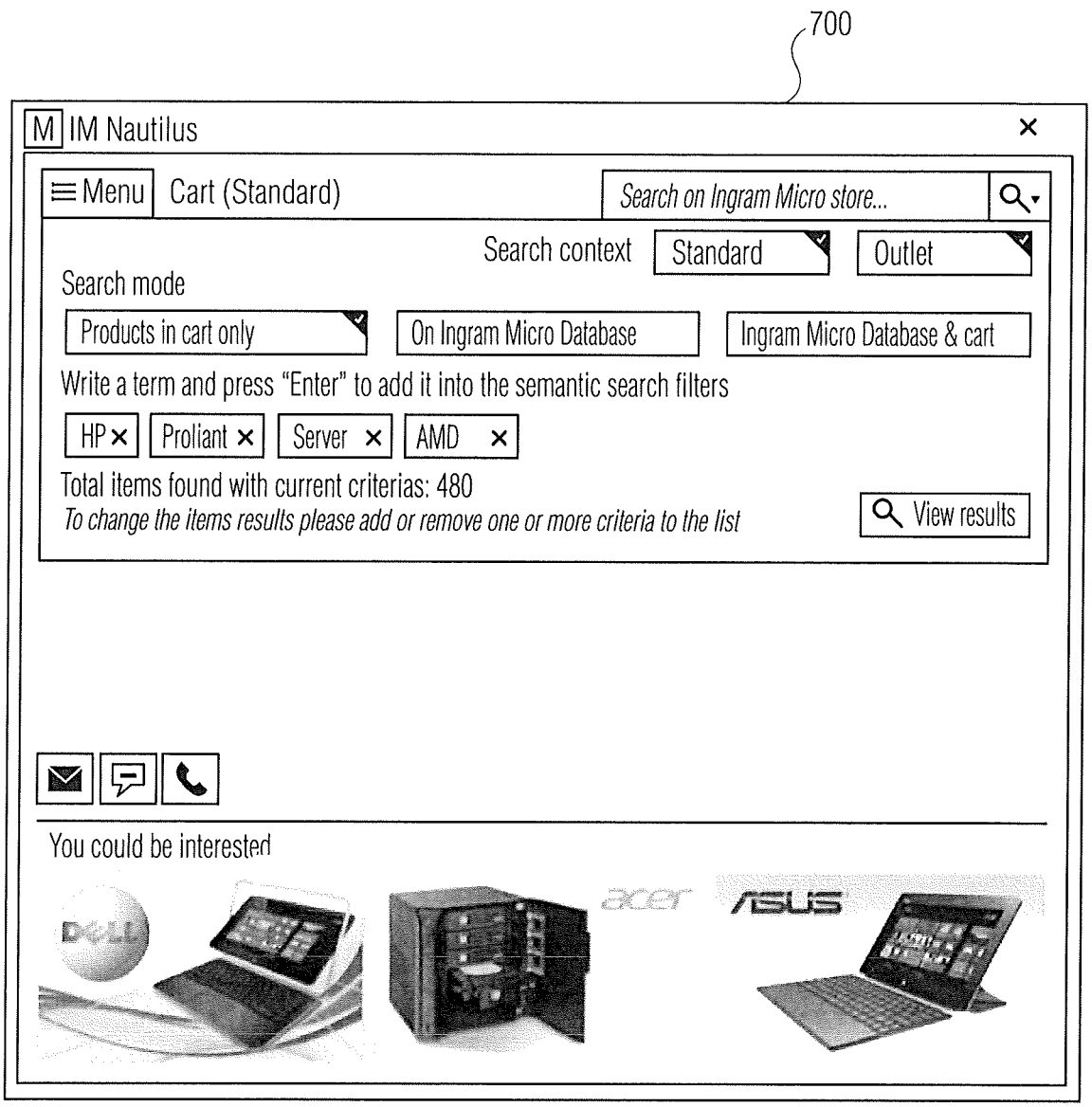
FIG. 7 shows an exemplary interface, for example of FIG. 2 or FIG. 5, where a search section (upper frame) has been expanded in an advanced operating mode, according to an embodiment of the present disclosure.
Figure 8:
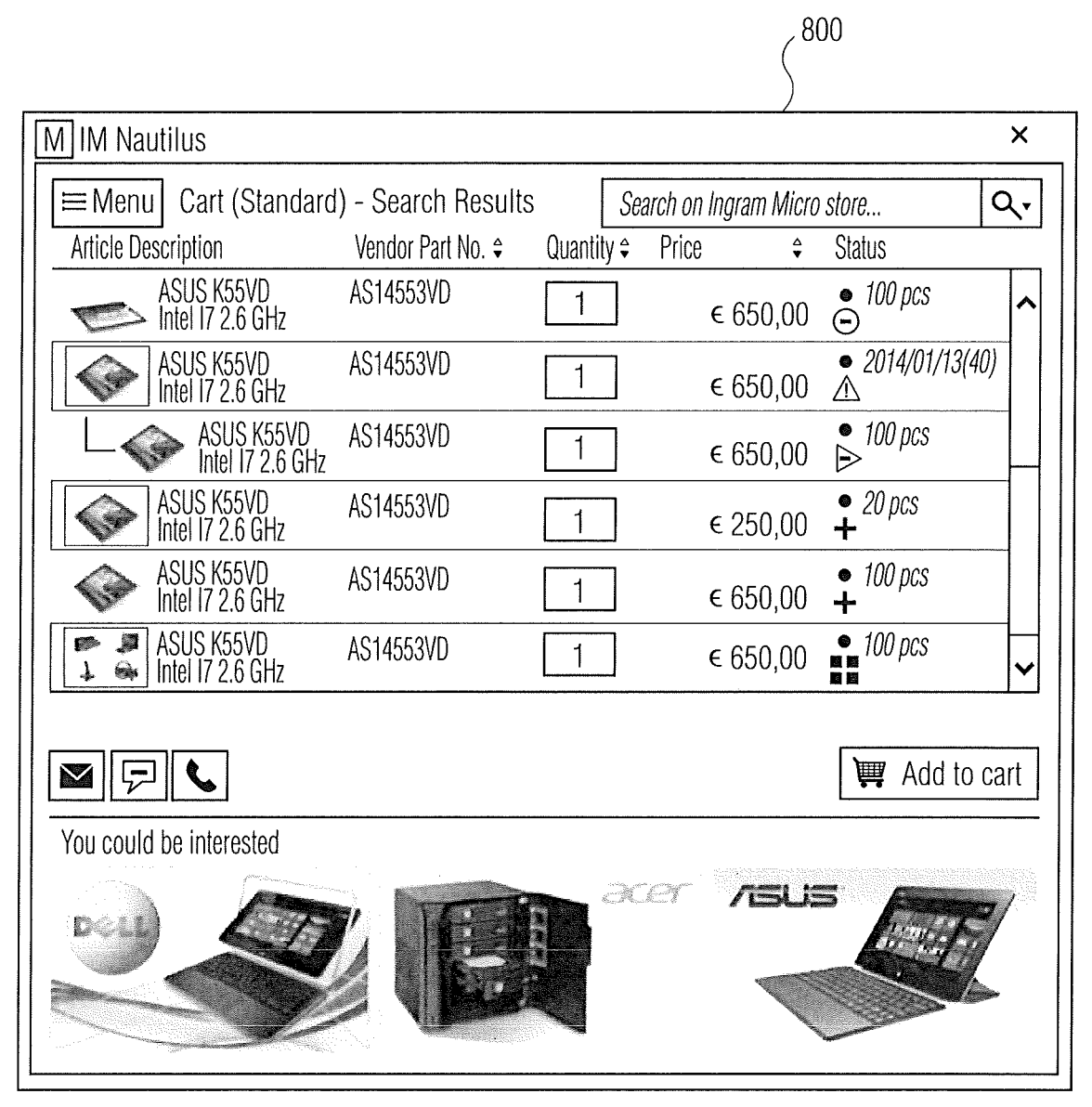

The web interface of the Supplier B may comprise a specific search section which is expandable and collapsible (for example as shown in exemplary interface 700 of FIG. 7) and which may be present on all or any of the pages of the client application. Said search section may be available in the shopping cart of the alternative Supplier A. For example, a function may be provided for accessing a shopping cart for new products (e.g., Standard cart) or a shopping cart for partially defective products (e.g., Outlet cart), each of them being provided with a search function, preferably able to provide results for both new products and partially defective products, irrespective as to whether the search is called up from the new products cart or the partially defective products cart (for example as shown in screenshot 800 of FIG. 8). By way of default the search mask may be displayed in compact mode and by clicking an expansion button it can be displayed in advanced mode.

To illustrate, by means of an advanced search, different search contexts may be defined: for example, in a "Standard" context the search may be carried out only for new articles, products, solutions and/or services; and in an "Outlet" context, a search may be carried out only for partially defective articles, products, solutions and/or services. It is possible to carry out a search in both contexts and apply certain search filters, including: products, solutions and/or services present in the cart, products, solutions and/or services present in database(s) of the Supplier A, and products, solutions and/or services present both in the cart and in the database(s) of the Supplier A.

The choice of a context or a filter may be carried out by clicking on a corresponding icon (or any other means); the context or filter selected may be indicated by a check symbol (for example, at the top on the right in the figure). By way of default, searching for articles may be in the database(s) of the Supplier A, in the Standard and Outlet context.

Several items, connected by a search operator, such as "AND", may be entered in the search mask. The results of the search may be displayed in pages, for example up to a maximum of 50 elements per page (for example as shown in screenshot 800 of FIG. 8).

The articles, products, solutions and/or services displayed after the search or cart transfer may be ordered according to certain criteria, including (without limitation): 1. available products, solutions and/or services; 2. products, solutions and/or services awaiting supply; and 3. all other categories. The products, solutions and/or services may also be ordered according to any criteria, including, for example, at least one of the following criteria: seller; increasing price; and decreasing price, rating, units sold, etc.

After carrying out a search, the User may select the products, solutions and/or services to be inserted in the cart and/or enter the quantity and the products, solutions and/or services in the cart may be marked with a check symbol.

The search may also come up with products, solutions and/or services which are an alternative to those searched for. These products, solutions and/or services may be indicated by means of a link with the original item(s), but products, solutions and/or services similar to those searched for, but which are more advantageous, for example with the same performance and lower price or the same price and better performance, could also be indicated.

Figure 9:
FIG. 9 shows a screenshot of an exemplary result of a snap-shot of the cart of a Supplier A or B to which a further product and/or service or a solutions product has been added by the User, according to an embodiment of the present disclosure.

By means of an exemplary interface as shown in screenshot 900 of FIG. 9, it is possible to view the complete list of articles (e.g., products, solutions and/or services) present in the cart or the articles offered as an alternative to those selected. This interface may comprise a section which lists the articles with the following information (without limitation): a picture of the article, a short description of the article, the part number (e.g., code), the quantity, the price of the Supplier B (e.g., in the case where the cart of the Supplier A has been filled based on the cart of the Supplier B and not directly or exclusively from a search for products in the database of the Supplier A), the price of the article from the Supplier A, the availability of the article (e.g., where available=green; momentarily not available=orange, with an indication of the expected date of arrival of the merchandise and respective quantity; and an article not in price list=grey) and the quantity of the article available in the warehouse of the Supplier A.

In addition to the information given above, the articles may be distinguished by an icon or graphical symbol.

By positioning the pointer of a mouse or a touch screen interface or other selection and pointer system on an article, a window with an indication of the price of the article from any other Supplier B (e.g., generic Supplier) and the price from the Supplier A (e.g., alternative Supplier) may be displayed and a further click with the mouse may allow the information to be expanded for further technical details.

Similarly, by positioning said pointer on the picture of the alternative article, a comparative profile of the article may be selected and the corresponding article of the Supplier B may be displayed, in this case also, with a further click, a comparison between the respective prices may be highlighted. By positioning the pointer on the picture of the father article, the technical profile of the father article alone including the price may be displayed. In a similar manner to the procedure for an article, by positioning the pointer on a "Solution", the technical profile of the solution may be displayed.

The web interface also may comprise a summary section which shows any savings obtained by confirming the order with the Supplier A, points obtained by placing said order, which may be used later for discounts or other purchases, and the total price of the cart.

In order to proceed with the purchase of the products in the cart, a Check-Out button may be provided for activating a function which completes the purchase. The function may check that the cart is up-to-date and, in the case of a discrepancy between the values (e.g., price) displayed and those in the price list, it may propose to the User the option of accepting updated prices, continuing in this case with check-out of the updated prices, or the option of refusing the order.

The "Outlet" shopping cart may substantially correspond, in terms of functional features, to the "Standard" shopping cart, with a number of differences which allows one to specify, for example, the reason for which the product is considered to be partially defective. In particular, the following information may be provided (without limitation): picture of the article, article code, short description of the article, notes describing the article defect, manufacturer code, quantity required, price of the original article, outlet price, and availability.

The "Solutions" shopping cart also may have functional features which substantially correspond to those of the Standard cart, with one or more characteristic differences, for example, that a "solution" is a set of standard articles, for example four or less than four articles which must be purchased together or in any case products or services which are in some way related for example: a printer, the corresponding toner and the paper and/or installation thereof.

Each "solution" may be characterized by the following information (without limitation): a picture for each article which forms the solution, the article codes, a short description of the solution, the date of availability, the quantity required, the quantity available, and the price of the solution.

The products in the "Solutions" category, may be managed separately from the partially defective products (e.g., Outlet category) and therefore may be in a third cart for the solutions which does not contain outlet products.

Figure 10:
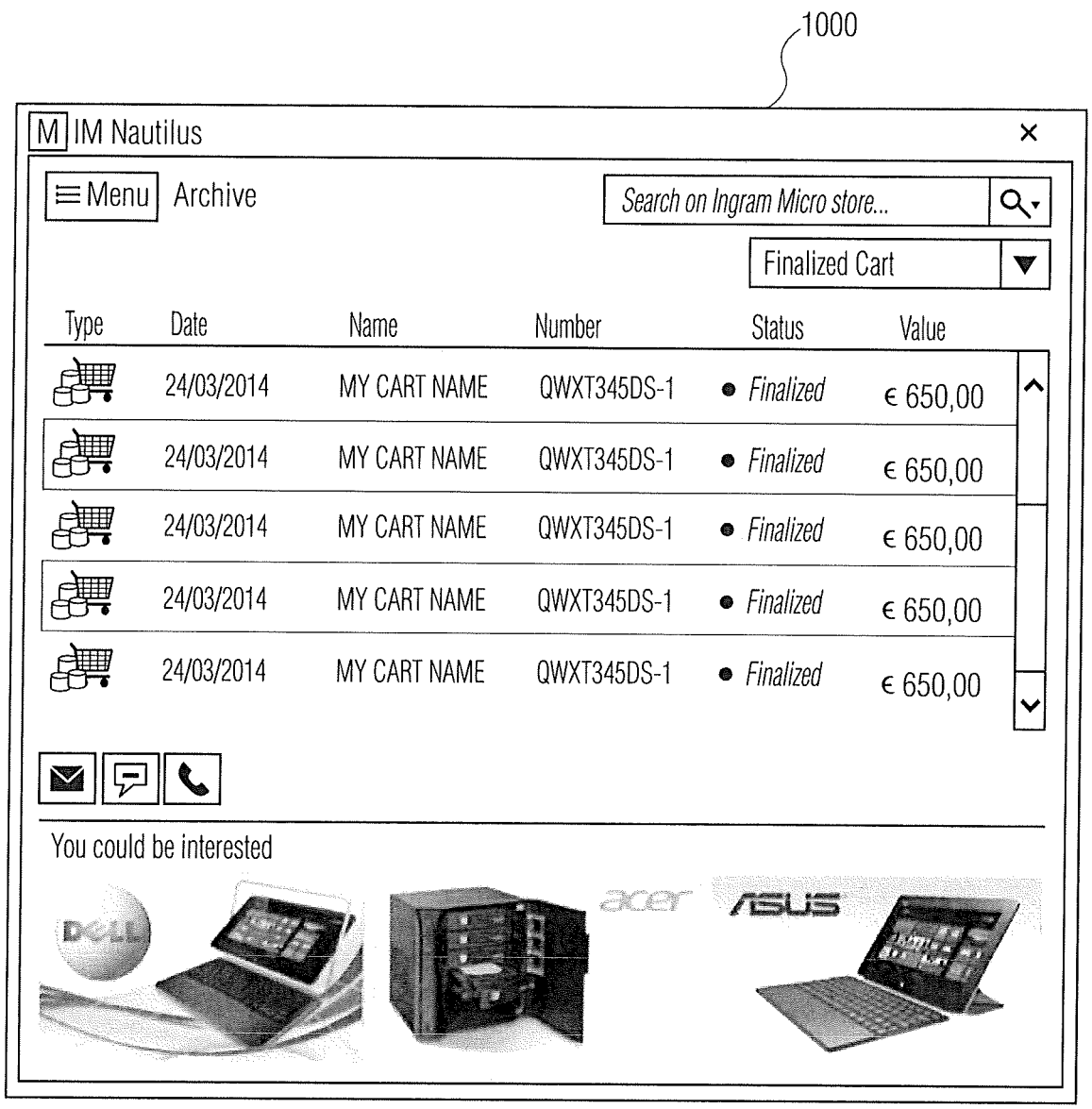
FIG. 10 is an exemplary graphical interface showing the orders or carts managed in the past by a given User and for which the ordered products have been purchased, according to an embodiment of the present disclosure.
Figure 11:
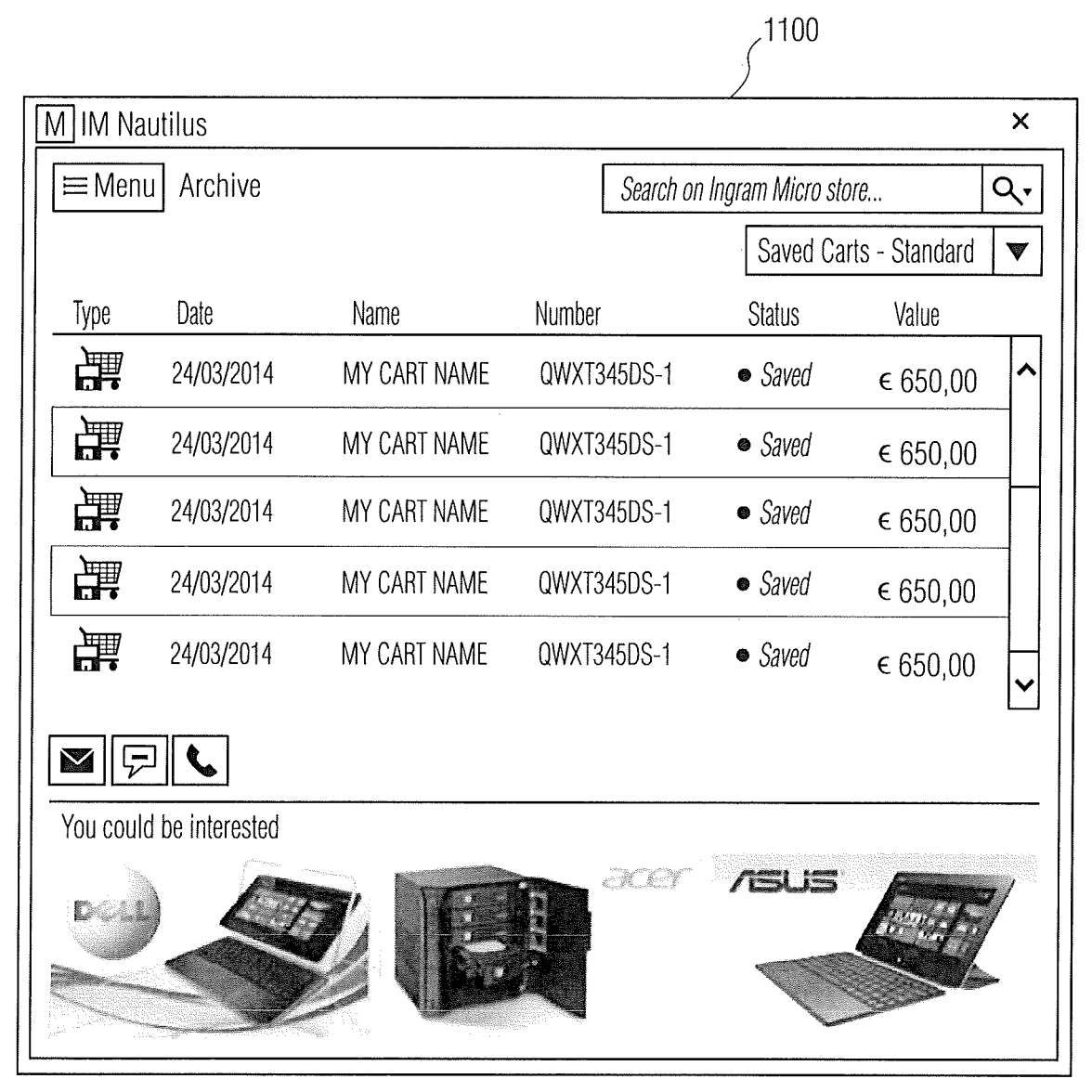
Figure 12:
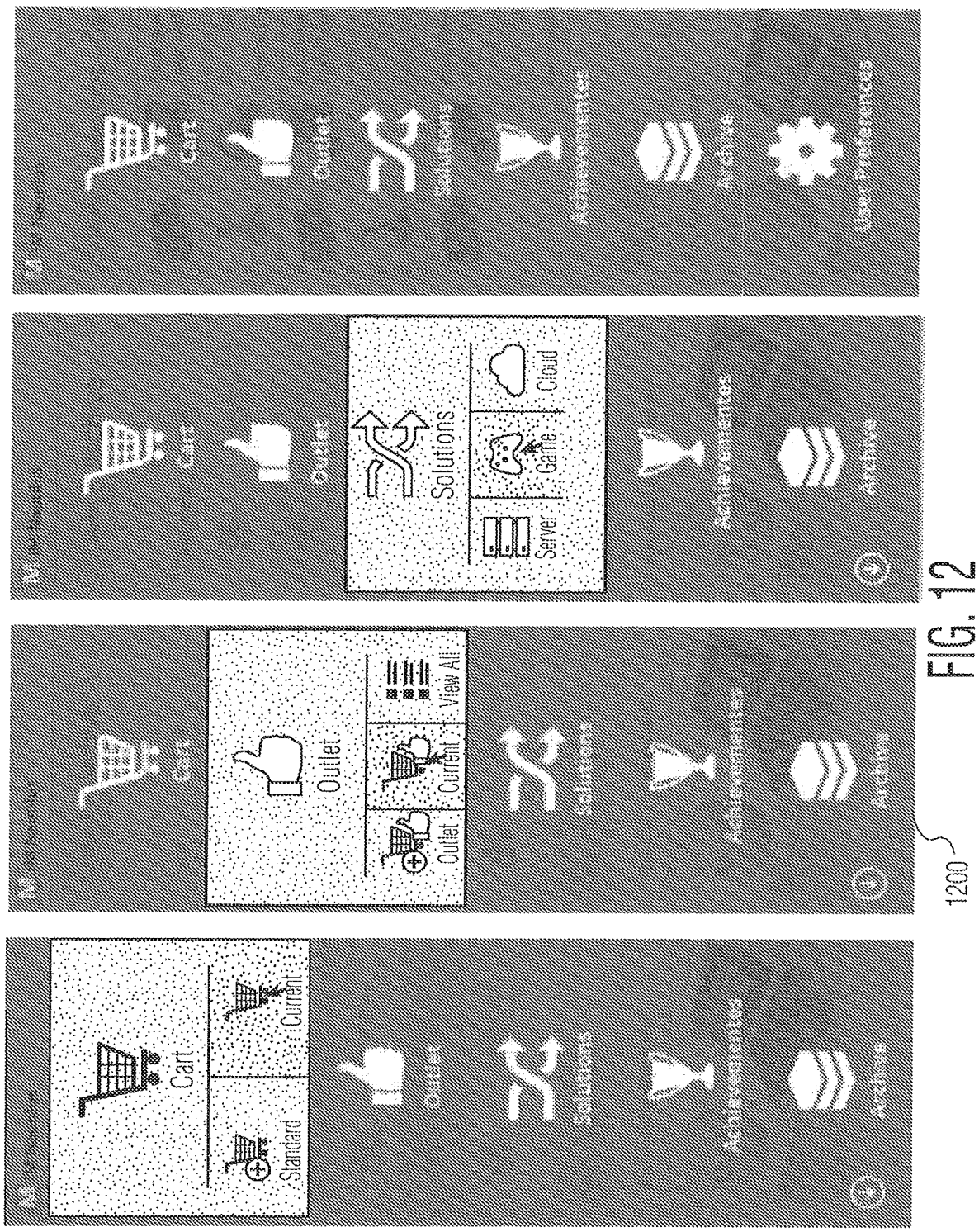
FIG. 12 shows an exemplary screenshot/mask for access to the various functions provided by the order management method, the mask being shown with selection of four different User functions, according to an embodiment of the present disclosure.

Other integrated modules for managing points earned during the order (e.g., "Achievements") may be provided. Storing the list of the last n carts of the User may be divided up into 1) completed carts (for example as shown in exemplary graphical interface 1000 of FIG. 10), e.g., carts for which the check-out operation has been performed; 2) saved Standard carts (for example as shown in exemplary graphical interface 1100 of FIG. 11), e.g., carts relating to an order for new products or solutions for which check-out has not yet been performed; 3) saved Outlet carts. Displaying a list of carts may be distinguished, for example (without limitation) by the cart type (e.g., Completed, saved Standard, saved Outlet), the date of creation or completion of the cart, the cart name (e.g., name assigned by the User upon initial saving of the cart), cart identification (e.g., order identification), the cart state (e.g., completed or saved); the cart value (e.g., total amount), and the payment terms.

According to one embodiment of the present disclosure, a module for confirmation of an order is provided. Said module may be available to registered Users who have a username and password (or other identifying information) and may not be available to temporary Users, who may be invited by the confirmation module to complete registration with a username and password. The temporary User may be advised to register by means of a message sent from the website of the Supplier A.

For Users which already have access credentials, the confirmation module may check for the remaining credit associated with the client, the payment date which the User intends to use, for example (without limitation) 30 days, or 60 days. Depending on the selected payment date, an increase in the total amount of the cart, for example by 0.3%, may occur.

At the end of the check-out function, data relating to the order and the payment may be transferred to a server of the Supplier A which manages the order, the invoicing and the despatch independently.

The methods and systems according to the present disclosure may be used for management of the order and may also include management of the purchase, including the invoice or financial transaction, allowing these operating steps to be managed in the purchase system of the Supplier A.

The methods and the systems according to the present disclosure may solve technical problems described above and achieve numerous advantages, including (without limitation) that they enable an intended purchase by a User to be intercepted and an alternative or a choice to be offered, and they reduce resource consumption and increase computing efficiency of the computing devices and system components implement and/or executing the methods and systems described herein.

The methods and the systems according to the present disclosure may provide User advantages, including (without limitation) that they can allow a User to compare the price of a product and check carefully its technical details before making a purchase, and this check can be carried out by connecting up to the on-line shops of various Suppliers, making a note of the prices and the details of the products of interest offered by each Supplier, and choosing the product and the Supplier on the basis of the selling price or purchase conditions or other specific characteristics of the product and/or service which is to be purchased.

A search and compare software application according to the present disclosure may be configured to act as an interface between an order placed with a Supplier A and the on-line sales system of the Supplier A and may not completely replace the functional features of said sales system, but may supply it with information, for example, in the case where the User recognizes the offer of the Supplier A as being advantageous.

This structuring of the search and compare software application in the form of a specific program or middleware between the client application of the Supplier B, on the one hand, and the on-line sales system of the Supplier B, on the other hand, may reduce to the minimum the memory space and system requirements needed to implement the method of the present disclosure in the electronic device of the User, and may also speed up the formulation of the alternative offer of the Supplier B.

In other words, the method may be implemented by operating between the different on-line sales systems of the Supplier B and the Supplier A, acting as a one-way interface with the sales system of the Supplier A and/or B, but avoiding duplicating the sale management functions already present in the sales system of said Supplier A and/or B.

The invention claimed is:

1. A system for managing a purchase order, the system comprising:
   one or more computers executing a first software application of a first supplier and a second software application of a second supplier, the second supplier being an alternative supplier to the first supplier, the second software application authorized by a user of the one or more computers, the second software application configured to run in a background on the one or more computers;
   the one or more computers executing software to:
   insert, by the first software application, one or more items into a first shopping cart associated with the first supplier to form a compiled order, said inserting being triggered in response to an online search executed by the one or more computers, said one or more items comprising at least one of a product and a service offered by the first supplier;
   receive, by the first software application from among the one or more computers, an indication of an order submission for the compiled order;
   send, by the first software application, an order submission message to the first supplier, in response to receiving said indication, the order submission message including information comprising the compiled order in the first shopping cart;
   detect, by the second software application that is running in the background, the order submission message;
   based on the detecting of the order submission message, intercept, by the second software application, the order submission message;
   parse, responsive to the intercepting of the order submission message, HTML code included in said order submission message, said HTML code containing the information comprising the compiled order in the first shopping cart;
   automatically create, by the second software application, a second shopping cart associated with the second supplier responsive to the parsing of the HTML code;
   automatically transfer, by the second software application, responsive to the creating of the second shopping cart, all of the one or more items from the first shopping cart of the first supplier into the second shopping cart of the second supplier, by identifying and reformulating the compiled order in the second shopping cart based on the parsed HTML code;
   automatically search for additional items, the additional items being identical to the one or more items transferred from the first shopping cart of the first supplier or alternative items available from the second supplier, said automatically searching being initiated by the second software application based on the parsed HTML code;

insert, by the second software application, the additional items found at the second supplier into the second shopping cart of the second supplier, such that the one or more items transferred from the first shopping cart and the inserted additional items all reside in the second shopping cart of the second supplier simultaneously; and present, by the second software application, the inserted additional items found at the second supplier together with the one or more items transferred from the first shopping cart simultaneously in the second shopping cart of the second supplier for comparison.

2. The system according to claim 1, further comprising the one or more computers executing software to:

compare at least one price of the additional items available from the second supplier with at least one price of the one or more items available from the first supplier.

3. The system according to claim 1, further comprising the one or more computers executing software to:

generate and display comparative information comparing a purchase price of the additional items in the second shopping cart of the second supplier with a purchase price of the one or more items of the first supplier.

4. The system according to claim 1, wherein said second software application of the second supplier automatically activates a web interface, the web interface comprising the second shopping cart by means of a pop-up window or an alert window.

5. The system according to claim 1, wherein a plurality of shopping carts associated with one or more types of items are managed simultaneously, wherein said management comprises at least one of creating a new shopping cart, saving the new shopping cart with associated items, deleting the new shopping cart, and checking out the new shopping cart.

6. The system according to claim 5, wherein checking out the new shopping cart comprises transferring ordered items in the second shopping cart to a purchase system of the second supplier, said purchase system being configured to perform management of at least one of payment, invoicing, and delivery of the ordered items.

7. The system according to claim 1, wherein said second software application is downloaded from an Internet site or an address of the second supplier as an executable file.

8. The system according to claim 1, wherein the one or more computers comprises a network of multiple interconnected computers.

9. A method for improved management of a purchase order, comprising:

providing one or more computing devices executing a first software application of a first supplier and a second software application of a second supplier, the second supplier being an alternative supplier to the first supplier, the second software application authorized by a user of the one or more computing devices, the second software application configured to run in a background on the one or more computing devices;

inserting, by the first software application, one or more items into a first shopping cart associated with the first supplier to form a compiled order, said inserting being triggered in response to an online search executed by the one or more computing devices, said one or more items comprising at least one of a product and a service offered by the first supplier;

receiving, by the first software application from among the one or more computing devices, an indication of an order submission for the compiled order;

sending, by the first software application, an order submission message to the first supplier, in response to receiving said indication, the order submission message including information comprising the compiled order in the first shopping cart;

detecting, by the second software application that is running in the background, the order submission message;

based on the detecting of the order submission message, intercepting, by the second software application, the order submission message;

parsing, by the second software application responsive to the intercepting of the order submission message, HTML code included in said order submission message, said HTML code containing the information comprising the compiled order in the first shopping cart;

automatically creating, by the second software application, a second shopping cart associated with the second supplier responsive to the parsing of the HTML code;

automatically transferring, by the second software application, responsive to the creating of the second shopping cart, all of the one or more items from the first shopping cart of the first supplier into the second shopping cart of the second supplier, by identifying and reformulating the compiled order in the second shopping cart based on the parsed HTML code;

automatically searching for additional items, the additional items being identical to the one or more items transferred from the first shopping cart of the first supplier or alternative items available from the second supplier, said automatically searching being initiated by the second software application based on the parsed HTML code;

inserting, by the second software application, the additional items found at the second supplier into the second shopping cart of the second supplier, such that the one or more items transferred from the first shopping cart and the inserted additional items all reside in the second shopping cart of the second supplier simultaneously; and presenting, by the second software application, the inserted additional items found at the second supplier together with the one or more items transferred from the first shopping cart simultaneously in the second shopping cart of the second supplier for comparison.

10. The method according to claim 9, wherein the second software application comprises a search and compare software application associated with the second supplier and executed by the one or more computing devices.

11. The method according to claim 9, wherein the one or more items includes at least one group of products.

12. The method according to claim 9, wherein the one or more items includes at least one group of services.

13. The method according to claim 9, further comprising comparing at least one price of the additional items available from the second supplier with at least one price of the one or more items available from the first supplier.

14. The method according to claim 9, further comprising generating and displaying comparative information comparing a purchase price of the additional items in the second shopping cart of the second supplier with a purchase price of the one or more items of the first supplier.

15. The method according to claim 9, wherein said second software application of the second supplier automatically activates a web interface, the web interface comprising the second shopping cart by means of a pop-up window or an alert window.

16. The method according to claim 15, wherein said additional items of the second supplier comprise one or more of: new products, standard products, discounted products, discounted defective products, and combined products or solutions.

17. The method according to claim 16, wherein said standard products or said combined products are searched for and ordered separately or together via said web interface.

18. The method according to claim 16, wherein said standard products and said combined products are distinguished in said web interface by at least one associated graphical symbol.

19. The method according to claim 16, wherein said discounted defective products are searched for and ordered separately from said standard products and said combined products.

20. The method according to claim 15, wherein said web interface comprises at least one of an adjustable counter associated with each item in the second shopping cart, a graphical symbol representing an availability of each additional items from the second supplier and a graphical symbol representing an item type.

21. The method according to claim 20, said item type representing at least one of partially defective products and defect-free products.

22. The method according to claim 9, wherein a plurality of shopping carts associated with one or more types of items are managed simultaneously, wherein said management comprises at least one of creating a new shopping cart, saving the new shopping cart with associated items, deleting the new shopping cart, and checking out the new shopping cart.

23. The method according to claim 22, wherein checking out the new shopping cart comprises transferring ordered items in the second shopping cart to a purchase system of the second supplier, said purchase system being configured to perform management of at least one of payment, invoicing, and delivery of the ordered items.

24. The method according to claim 9, wherein said second software application is executed as middleware or a data input/output interface between a purchase system of the first supplier and a purchase system of the second supplier.

25. The method according to claim 24, wherein when said second software application is executed as middleware, said middleware receiving as input the one or more items ordered via the purchase system of the first supplier and providing as its output, for the purchase system of the first supplier, at least one among the one or more items and the additional items indicated to be purchased from the second supplier.

26. The method according to claim 9, wherein said second software application comprises a plug-in and said plug-in is installed in at least one browser or navigator of an electronic device used by the user to formulate the compiled order.

27. The method according to claim 9, wherein said second software application is downloaded from an Internet site or an address of the second supplier as an executable file.

* * * * *